United States Patent [19]

Suchowski

[11] 4,089,299
[45] May 16, 1978

[54] AIR-OPERATED FISH FEEDER

[75] Inventor: Bernard Suchowski, Marlboro, N.J.

[73] Assignee: The Hartz Mountain Corporation, Harrison, N.J.

[21] Appl. No.: 751,810

[22] Filed: Dec. 17, 1976

[51] Int. Cl.² ............................................. A01K 61/02
[52] U.S. Cl. ................................................ 119/51 R
[58] Field of Search ..................... 119/51 R, 51.11;
222/369; 60/496, 495, 497

[56] References Cited

U.S. PATENT DOCUMENTS

| 271,040 | 1/1883 | Cook | 60/496 |
| 936,170 | 10/1909 | Rulison | 222/369 |
| 975,157 | 11/1910 | Quedens | 60/496 |
| 2,847,066 | 8/1958 | Kleiber et al. | 119/5 X |
| 3,874,340 | 4/1975 | Lemond et al. | 119/51 R |

Primary Examiner—Hugh R. Chamblee
Attorney, Agent, or Firm—Davis, Hoxie, Faithfull & Hapgood

[57] ABSTRACT

An air-operated fish feeder in which fish food is periodically deposited into an aquarium by driving a measuring cup by an air operated drive member via a gear transmission. The cup travels through a hopper containing fish food to scoop a measured amount thereof and thereafter the cup is inverted to dispense the food into the aquarium via a suitable chute.

9 Claims, 5 Drawing Figures

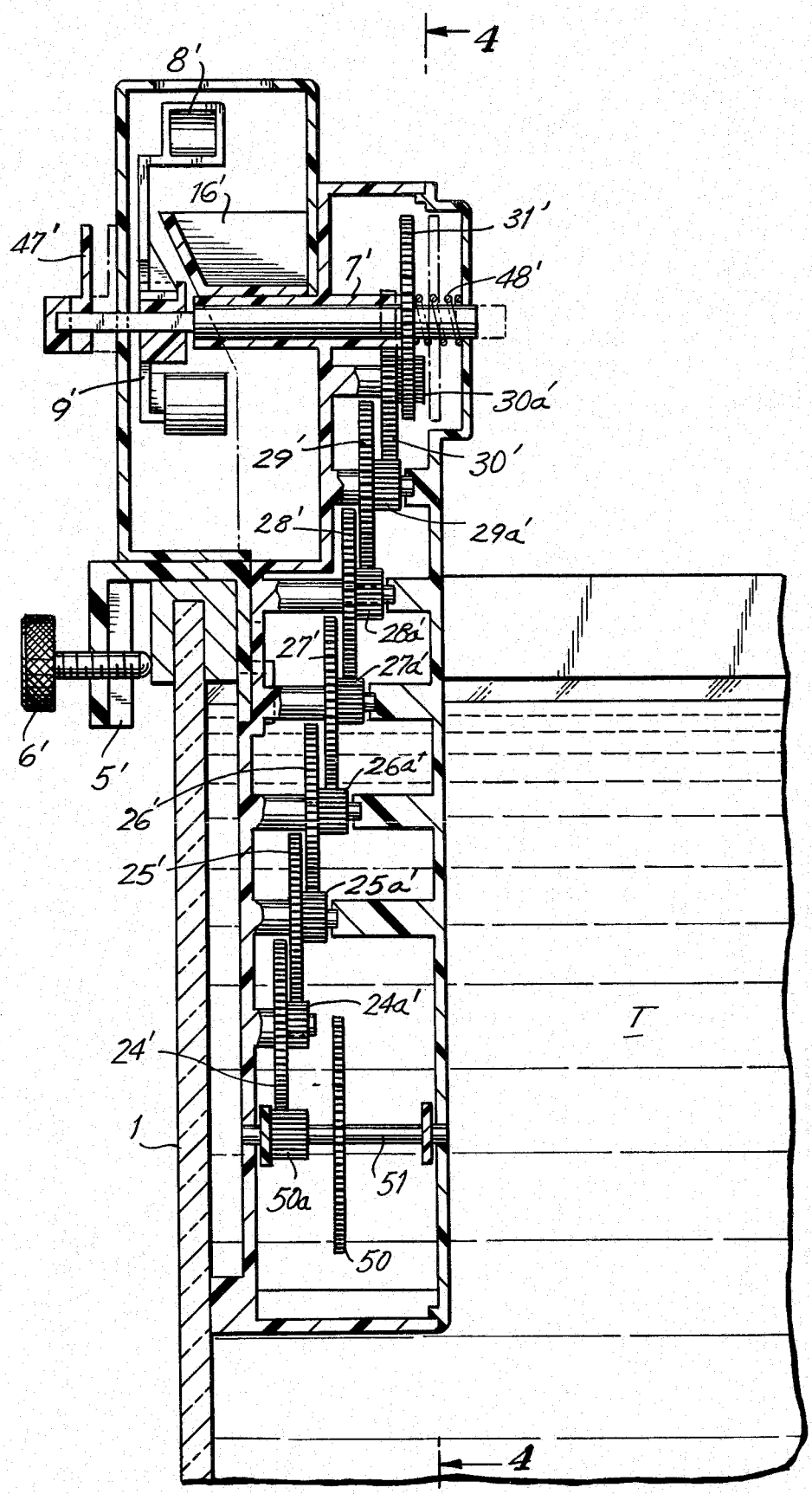

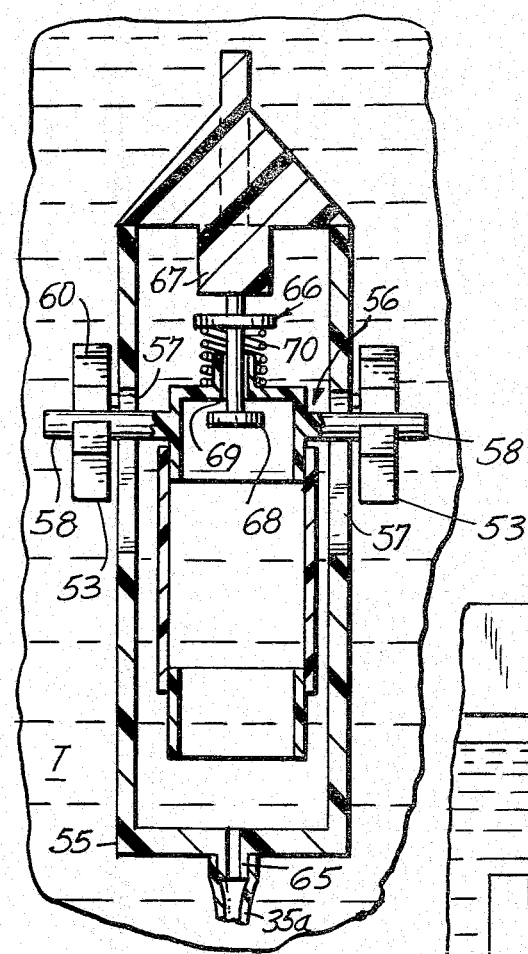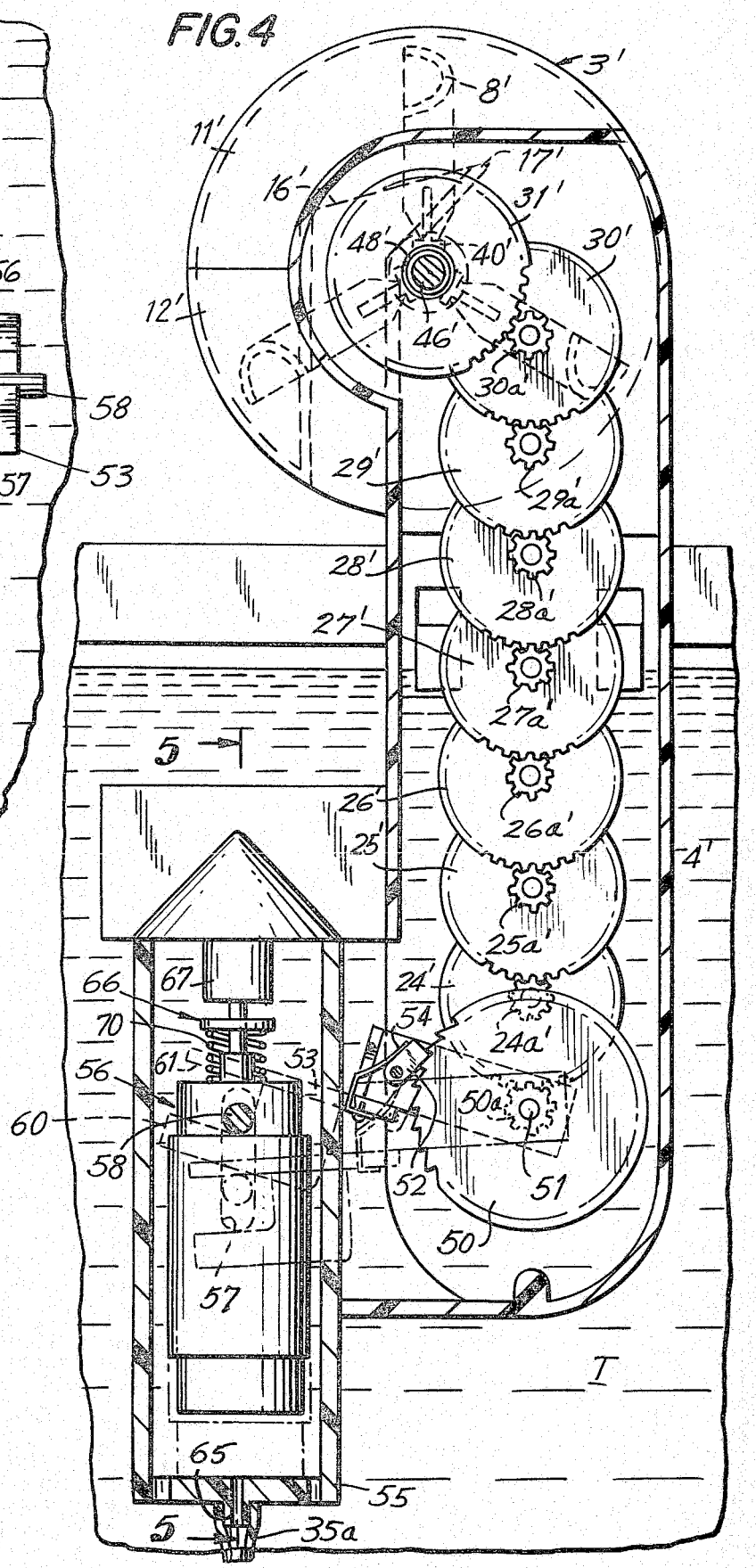

AIR-OPERATED FISH FEEDER

FIELD OF THE INVENTION

The invention relates to an air-operated feed dispenser for periodically dispensing measured amounts of fish food into the aquarium.

BACKGROUND

Aquarium fish benefit from regular feedings of measured quantities of food. Automatic feeders continue the feeding regimen during the absenses of the hobbyist. Automatic feeders heretofore have required an electric clock mechanism with the accompanying problems of providing a power outlet, management of another electric cord in addition to those for air and water pumps, heaters and lights, and present an additional potential shock and fire hazzard.

SUMMARY OF THE INVENTION

An air pump is mandatory for aeration of aquarium water. The present invention makes further use of that air to drive a mechanism which periodically dispenses measured quantities of particulate food according to a desired feeding schedule.

An object of the invention is to provide a feeder which is relatively simple in construction and which will operate reliably.

Another object of the invention to provide a fish feeder of the above type which is easily mounted on an aquarium tank, requires no electrical connection, and can be readily put into operation by the purchaser.

Yet another object of the invention is to provide a fish feeder of the above type which will be operated by means of a conventional air pump as commonly used in aquariums.

In accordance with the above objects, there is provided a fish feeder comprising a housing including means for suspension of the housing on an aquarium, a chamber for a supply of particulate fish food, a measuring cup positioned for travel through said food supply chamber to become filled with a measure of fish food, a dispensing passageway adjacent the path of travel of said cup for receiving the fish food therefrom and for dispensing the fish food into the aquarium, the cup becoming inverted adjacent the dispensing passageway to drop the fish food, and air driven motor means coupled to said cup to move the cup.

In further accordance with one embodiment of the invention, the air driven motor means comprises a rotatable driving wheel, air release means associated with said driving wheel for causing rising air to rotate the wheel, and gear means between the driving wheel and the cup for transmitting drive therebetween.

The invention further contemplates a method of periodically depositing fish food into an aquarium comprising driving a submerged rotatable member by means of rising bubbles of air to cause rotation of a measuring cup and locating the cup so that, in the course of rotation thereof, the cup passes through a supply of fish food to scoop a measure of food therefrom and thereafter is inverted to deposit the scooped food into theaquarium.

The fish feeder of the present invention is entirely constructed of plastic materials which are unaffected by water, require no lubricants and are not susceptible to rust or corrosion. Since it is driven by the air otherwise needed for aeration, no connection to electrical power is needed thereby eliminating the clutter of power cards, corrosion problems, and any shock hazzard. Since the construction is simple, rugged and not prone to wear or age problems, the life expectancy of the unit is long.

BRIEF DESCRIPTION OF THE DRAWING

FIG. 3 is sectional view similar to FIG. 2 of a second embodiment of the fish feeder according to the invention;

FIG. 4 is a front elevational view in section taken along line 4—4 in FIG. 3; and FIG. 5 is a sectional detail of a part of the embodiment of FIG. 3, taken along line 5—5 of FIG. 4.

DETAILED DESCRIPTION

Figure 1:
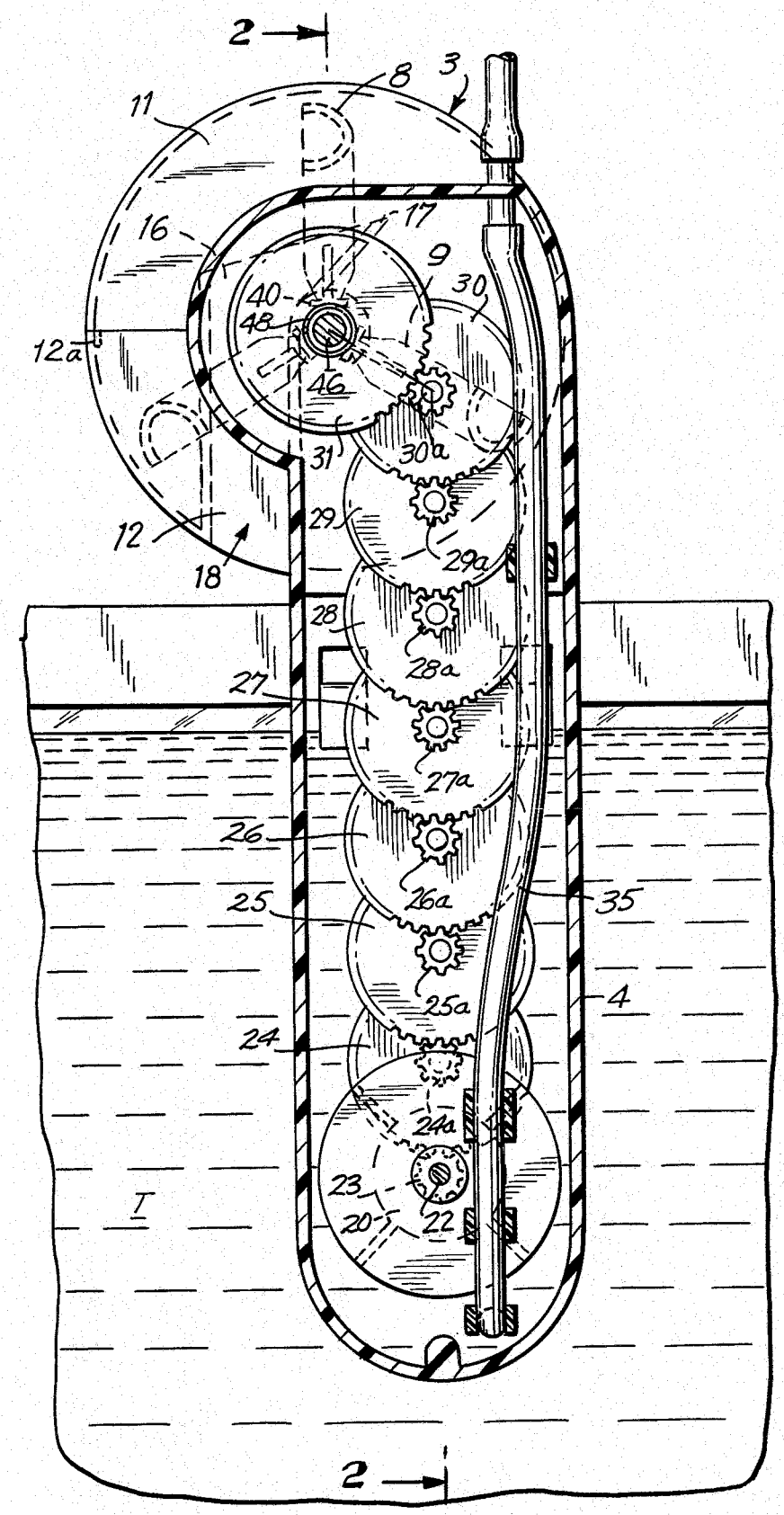
FIG. 1 is a front elevation view in section of a first embodiment of a fish feeder according to the invention.
Figure 2:
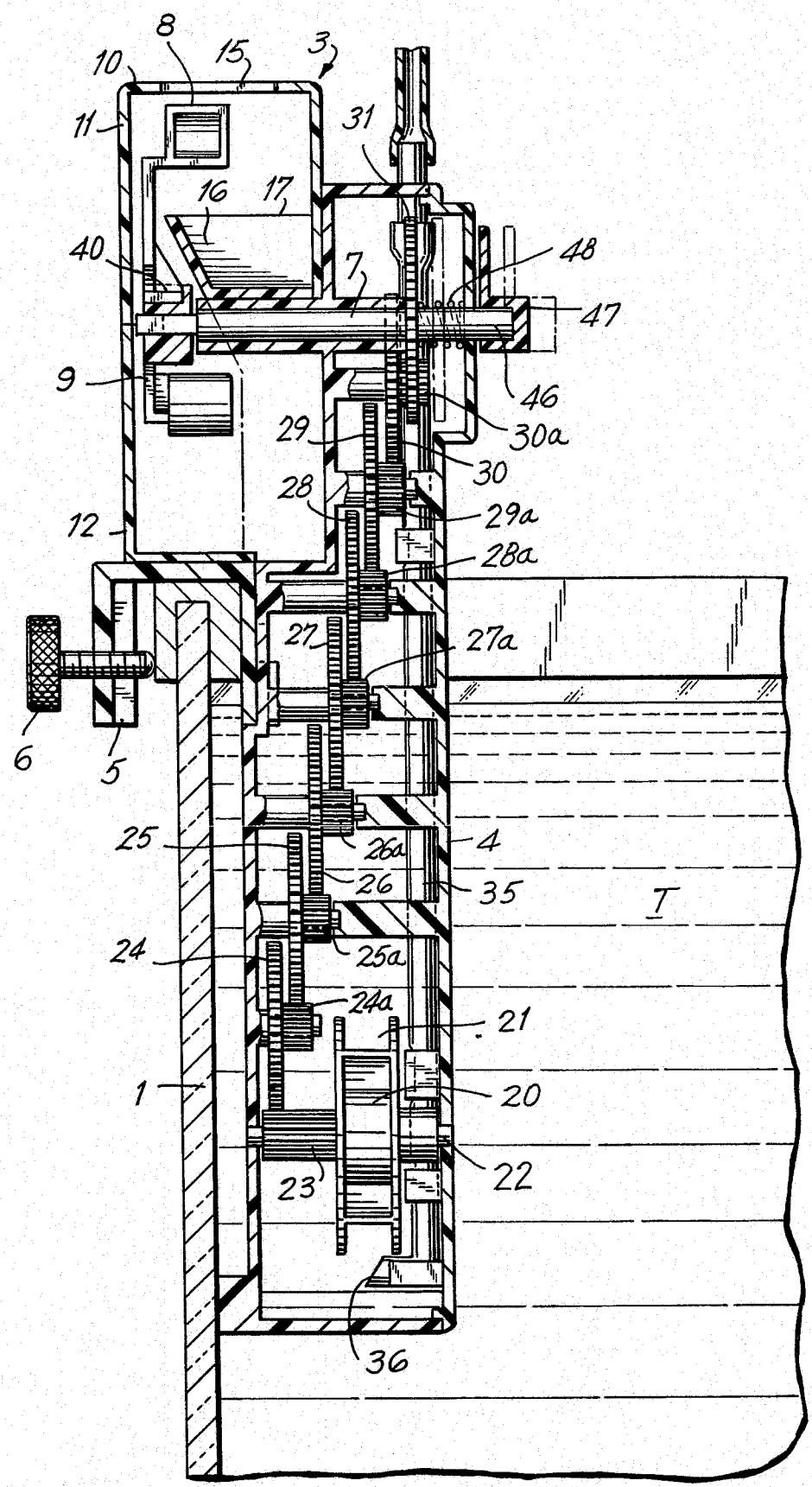
FIG. 2 is a sectional view taken along line 2—2 in FIG. 1.

Referring to the embodiment illustrated in FIGS. 1 and 2 of the drawing, therein can be seen the wall 1 of aquarium tank T to which the fish feeder 3 is attached. The fish feeder comrpises a vertically elongated housing 4 composed of a transparent plastic material such as polystryene. A clamp member 5 is secured to the housing and carries a threaded thumb screw 6 which enables the housing to be clamped to the wall 1 of the aquarium tank such that the major lower portion of the housing 4 can be immersed in the water in the aquarium tank. The housing 4 is not sealed and is open to permit water to circulate between the housing and the aquarium tank.

Supported in a top portion of the housing is a rotatable driven shaft 7 which carries a plurality of plastic feed measuring cups 8 affixed to radial arms 9 which are removably mounted on shaft 7 and rotatable therewith.

The upper portion of the feeder 3 includes a cylindrical food hopper 10 in which the feed cups are rotatable. The cylindrical part 10 includes an upper portion 11 and a lower portion 12, the upper portion 11 being removable from the lower portion 12 by simply lifting the same therefrom. The upper portion is retained on the lower portion by means of projections 12a at opposite ends. The lower portion 12 serves as a hopper in which a supply of fish food can be retained. A large amount of fish food can be stored in the lower portion 12. The upper portion 11 is provided with an opening 15 in communication with the atmosphere.

Extending within upper portion 11 is a dispensing passageway chute 16 whose upper edge 17 is disposed below the path of cups 8 when one of the latter is in its uppermost position as is shown in FIG. 2. The chute 16 has an outlet opening 18 at its lower end which is located in a position above the aquarium tank T but to one side of the housing 4. Accordingly, any food deposited into the chute 16 will be dispensed by gravity into the aquarium tank. In the course of one revolution of a feed cup 8, from the upright position shown in FIG. 2, it will pass through the hopper, scoop up a supply of fish food equal to the capacity of the cup and then travel to a position where the food will be emptied into the chute 16.

Driven shaft 7 and the feed cups which are attached thereto are driven by the following construction. At the lower end of the housing 4 there is a motor or drive means comprising a rotatably mounted a plastic paddle wheel 20 with a plurality of radial blades 21. Driving shaft 22 which carries the paddle wheel 20 has a pinion 23 which meshes with the first gear 24 of a train of plastic reduction gears 24—31 to establish driving connection between the paddle wheel and the driven shaft 7 which supports the feed cups. Each of the gears 24-30 is molded with a respective pinion 24a-30a to establish successive reduction drive from one gear set to the next. Gear 31 drives feed cup driven shaft 7.

An air conduit 35 extends into the housing 4 and it has a lower outlet 36 which is positioned below and offset from the axis of rotation of shaft 22 of the paddle wheel 20. The air conduit 35 is connected to a conventional air pump which is needed to aerate the water in the aquarium tank and bubbles of air are discharged from outlet 36. The position of the outlet is such that the rising air bubbles collect below the blades 21 of the paddle wheel 20 to cause rotation thereof. Rotation of the paddle wheel is transmitted through the gear sets 24–31 to produce rotation of the driven shaft 7. A gear reduction ratio established by the train of gear sets causes the shaft 7 to rotate at a relatively slow rate so that the discharge of the fish food from the feed cups into the conveyor chute will meet the requirement of the fish contained in the aquarium. The air pump supplies air to the conduit 35 at a constant rate which can be adjusted to achieve a desired rate of rotation of the paddle wheel 20. By way of example, it is contemplated that rotation of drive shaft 7 will be at the rate of approximately 1 revolution in 24 hours for a rotation of the paddle wheel driving shaft 22 at a speed of 55-75 rpm.

The arms 9 of the feed cups 8 are mounted on the driven shaft 7 by means of a slidable toungue-and-groove engagement 40 whereby the number of feed cups carried on the shaft is selectable.

In order to permit manual override of the automatic feeding, the shaft 7 is axially diplaceable in the housing and includes a projecting portion 46 with a manually engageable knob 47 fixed thereto. A spring 48 bears against the feed cup shaft driving fear 31 to urge the gear 31 forwardly into meshing engagement with pinion 30a. In order to override the drive through the gears, the knob 47 is engaged and the shaft 7 is retracted so that the gear 31 is no longer in mesh with pinion 30a. The shaft 7 is now free to be turned and the cups 8 can then enter the supply of fish food in hopper 12 and convey the scooped portion into the chute 16 for introduction into the aquarium tank in quantities as desired.

Air bubbles rise within housing 4 after turning paddle wheel 20. The rising air bubbles cause a gentle upward movement of water in housing 4 such that aerated water is released to the aquarium toward the upper portion of the open housing and water to be aerated is drawn into the housing 4 at the lower portion. The gentle upward movement of water through the housing causes aerated water to circulate in the aquarium.

The embodiment shown in FIGS. 3-5 is similar to that as shwon in FIGS. 1 and 2 except for the motor of drive mechanism to drive the gear train. Similar reference numerals with primes are applied to similar elements in the embodiment of FIGS. 3–5 and these will not be discussed in detail.

The drive mechansim to the gears which replaces the paddle wheel 20 and the air conduit 35 of the embodiment of FIGS. 1 and 2, comprises a plastic ratchet wheel 50 mounted on a shaft 51 carrying a pinion 50a which meshes with the lowermost of the gears 24' of the gear train coupled to the rotatable shaft carrying the feed cups 8'. The ratchet 50 is engaged by by a pawl 52 which is carried on a plastic lever arm 53 mounted to swing about the shaft 51. A spring 54 urges the pawl 52 into engagement with the teeth of ratchet wheel 50.

At the side of housing 4' is a chamber 55 which contains a hollow float member 56 open at the bottom. The chamber 55 is in communication with the water of the aquarium and is provided with vertical guide slots 57 at opposite sides thereof. The float 56 has a pair of lateral pins 58 which extend through the slots 57. The lever arm 53 is bifurcated to form a yoke at its free end with branches 60 having slots 61 in which pins 58 are loosely received.

At the bottom of chamber 55 there is secured an inlet 65 adapted for receiving an air conduit 35a from an air pump. When air is introduced into the chamber 55 through the inlet 65, bubbles of air travel upwardly and are caught in the interior of hollow float 56 to increase the buoyancy thereof to cause the float to rise. In the course of upward travel of the float, the lever arm 53 pivots counterclockwise as shown in FIG. 4 and causes rotation of the ratchet wheel 51 by engagement of the pawl 52. When the float reaches the uppermost position, a valve member 66 at the top of the body strikes a stop 67 fixed to the chamber 55, As is seen in FIG. 5, the valve member 66 includes a valve head 68 at its lower end which seals an opening 69. A spring 70 acts on the valve member 66 to urge the valve to a closed position. When the valve member 66 is depressed by striking the stop 67 the valve 68 is opened to release air through opening 69, whereby the body will now sink back to the bottom of the chamber 55 where it again is filled with air and the cycle repeated. In this way, the ratchet 51 is advanced to drive the gear train to rotation of shaft 7' carrying the feed cups 8'.

It is seen from the above that both embodiments carry out a method of periodically depositing fish food into the aquarium tank by driving a rotatble shaft carrying measuring feed cups using air which is also used for aeration of the water.

Although the invention has been described in conjunction with two embodiments thereof, it will become apparent to those skilled in the art that various modifications and variations can be effected without departing from the scope and spirit of the invention as defined in the attached claims.

What is claimed is:

1. An apparatus for periodically dispensing measured quantities of food to an aquarium comprising means to release air below the surface of the aquarium water, drive means having means to collect at least a portion of the released air, the drive means being moveable by the buoyancy of a quantity of collected air, a driving shaft located below the surface of the aquarium water connected to a driven shaft located above the surface of the aquarium water by a speed reduction means, said drive means being connected to said driving shaft to cause rotation thereof, and a feed measuring cup connected to said driven shaft and being rotatable with said driven shaft between a supply of feed and a feed dispensing passageway to convey a measured quantity of feed from said supply to said passageway.

2. The apparatus of claim 1 wherein said drive means comprises a paddle wheel on said driving shaft, said wheel having radial blades to collect released air and having an axis located above and to one side of the means to release air, whereby released air is collected beneath blades on one side of wheel to cause rotation of the wheel and driving shaft.

3. The apparatus of claim 1 wherein said speed reduction means comprises a reduction gear train.

4. The apparatus of claim 3 wherein the feed measuring cup is carried by a radial arm attached to said driven shaft to scoop a measured quantitiy of feed from the supply of feed during a portion of a revolution of the driven shaft and to invert the cup over the feed dispensing passageway during another portion of a revolution of the driven shaft.

5. The apparatus of claim 4 wherein the driven shaft can be disengaged from said gear train for manual rotation.

6. The apparatus of claim 4 wherein a plurality of cups are carried by a plurality of circumferentially spaced radial arms.

7. The apparatus of claim 6 wherein the arms and cups are selectably removable from the driven shaft.

8. The apparatus of claim 1 wherein said drive means comrpises a hollow float having an open bottom located over the means to release air to cause to float to rise by the buoyancy of air collected in the float, means to release collected air from the float after it rises, and means connected to said float and to said drivng shaft to cause rotation of said shaft as the float rises.

9. The apparatus of claim 8 wherein the means to cause rotaion of the driving shaft comprises a toothed ratchet wheel on said shaft, a pivoted lever attached to said float, and a pawl on said lever adapted to engage the teeth of said ratchet wheel as the float rises.

* * * * *